United States Patent
Gatzke

(10) Patent No.: US 8,967,530 B2
(45) Date of Patent: Mar. 3, 2015

(54) SIGNAL STRENGTH DEPENDENT COVER UNLOCKING DEVICE FOR A DUCT HOUSING A SECONDARY POWER SUPPLY DEVICE IN AN AIRCRAFT FUSELAGE

(75) Inventor: Sten Gatzke, Emtinghausen (DE)

(73) Assignee: Airbus Operations GmbH, Hamburg (DE)

( * ) Notice: Subject to any disclaimer, the term of this patent is extended or adjusted under 35 U.S.C. 154(b) by 517 days.

(21) Appl. No.: 13/203,055

(22) PCT Filed: Feb. 24, 2010

(86) PCT No.: PCT/EP2010/001151
§ 371 (c)(1),
(2), (4) Date: Aug. 24, 2011

(87) PCT Pub. No.: WO2010/097213
PCT Pub. Date: Sep. 2, 2010

(65) Prior Publication Data
US 2012/0006938 A1    Jan. 12, 2012

Related U.S. Application Data

(60) Provisional application No. 61/154,990, filed on Feb. 24, 2009.

(30) Foreign Application Priority Data

Feb. 24, 2009  (DE) .......................... 10 2009 010 243

(51) Int. Cl.
*B64D 41/00* (2006.01)
*F03D 9/00* (2006.01)
(52) U.S. Cl.
CPC ............... *F03D 9/00* (2013.01); *F05B 2220/50* (2013.01); *F05B 2240/921* (2013.01); *Y02E 10/72* (2013.01); *B64D 41/007* (2013.01); *B64D 2241/00* (2013.01)
USPC ........................................... 244/58; 244/53 B
(58) Field of Classification Search
USPC ....................... 244/58, 53 B, 53 R, 129.1, 1 R
See application file for complete search history.

(56) References Cited

U.S. PATENT DOCUMENTS 4,418,879 A * 12/1983 Vanderleest ................. 244/53 B
4,456,204 A *  6/1984 Hapke .......................... 244/53 R (Continued)

FOREIGN PATENT DOCUMENTS

CN         1705585      12/2005
CN       101171147       4/2008

(Continued)

OTHER PUBLICATIONS

International Search Report for Application Serial No. WO 2010/097213 dated Oct. 5, 2010.

(Continued)

*Primary Examiner* — Tien Dinh
*Assistant Examiner* — Michael A Fabula
(74) *Attorney, Agent, or Firm* — Jenkins, Wilson, Taylor & Hunt, P.A.

(57) ABSTRACT

A power generation system for integration into an aircraft system, including a secondary power supply device having a generator turbine arranged in a duct running between a forward opening and a rearward opening on the fuselage of the aircraft. An electromagnetic unlocking device locks and unlocks a covering device on the forward opening, depending on a signal strength supplied to the unlocking device. The system also includes an actuation device that generates an opening or closing signal for an opening and closing device, and an opening function switching device that activates the unlocking device electrically with a signal strength that locks the covering device in an initial state, and on receipt of a power requirement signal from a power generation monitoring device, activates the unlocking device with a second signal strength that unlocks the covering device.

11 Claims, 2 Drawing Sheets

(56) References Cited

U.S. PATENT DOCUMENTS

| | | |
|---|---|---|
| 6,247,668 B1 | 6/2001 | Reysa et al. |
| 6,272,838 B1 | 8/2001 | Harvell et al. |
| 7,210,652 B2 | 5/2007 | Hein et al |
| 7,222,819 B1 | 5/2007 | Kelnhofer |
| 7,364,116 B2 * | 4/2008 | Nguyen et al. .................. 244/58 |
| 7,364,117 B2 * | 4/2008 | Dionne ........................... 244/58 |
| 7,469,545 B2 * | 12/2008 | Riley .............................. 60/794 |
| 7,540,142 B2 * | 6/2009 | Sheoran et al. .............. 60/39.83 |
| 7,600,714 B2 * | 10/2009 | Sheoran et al. ............. 244/53 B |
| 7,775,147 B2 * | 8/2010 | Crawford et al. ............. 89/1.14 |
| 7,891,605 B2 * | 2/2011 | Nguyen et al. .................. 244/58 |
| 7,950,606 B2 | 5/2011 | Atkey et al. |
| 7,982,328 B2 | 7/2011 | Huntemann |
| 8,061,650 B2 * | 11/2011 | Nguyen et al. .................. 244/58 |
| 8,141,816 B2 * | 3/2012 | Robbins et al. ............ 244/53 B |
| 2006/0071123 A1 * | 4/2006 | Nguyen et al. ............. 244/76 R |
| 2006/0102781 A1 * | 5/2006 | Hein et al. ...................... 244/58 |
| 2007/0068169 A1 * | 3/2007 | Riley .............................. 60/778 |
| 2011/0067393 A1 * | 3/2011 | Chase ............................. 60/484 |
| 2011/0127372 A1 * | 6/2011 | Nguyen et al. .................. 244/58 |
| 2012/0006938 A1 | 1/2012 | Gatzke |

FOREIGN PATENT DOCUMENTS

| | | |
|---|---|---|
| DE | 1 032 033 | 6/1958 |
| DE | 10 2006 003 138 A | 8/2007 |
| DE | 10 2009 010 243 | 9/2010 |
| EP | 1 099 630 | 5/2001 |
| EP | 1 767 455 A | 3/2007 |
| GB | 2 419 640 | 5/2006 |
| SU | 1817623 | 9/2005 |

OTHER PUBLICATIONS

International Preliminary Report on Patentability and Written Opinion for Application Serial No. PCT/EP2010/001151 dated Aug. 30, 2011.

Chinese Search Report for Application No. 20108009117.6 dated May 24, 2013.

Chinese Office Action for Application No. 20108009117.6 dated Mar. 31, 2014.

Chinese Office Action for Application No. 20108009117.6 dated Jun. 4, 2013.

Russian Decision to Grant for Application No. 201138959 dated Feb. 6, 2013.

* cited by examiner

SIGNAL STRENGTH DEPENDENT COVER UNLOCKING DEVICE FOR A DUCT HOUSING A SECONDARY POWER SUPPLY DEVICE IN AN AIRCRAFT FUSELAGE

RELATED APPLICATIONS

The present application is a national stage entry according to 35 U.S.C. §371 of PCT application No. PCT/EP2010/001151 filed on 24 Feb. 2010, which claims priority from German Application No. 10 2009 010 243.4, filed on 24 Feb. 2009, and from U.S. Provisional Application No. 61/154,990, filed on 24 Feb. 2009.

TECHNICAL FIELD

The invention concerns a power generation system for integration into an aircraft system.

In particular the power generation system can be embodied as a primary power generation system, or as a secondary power system.

BACKGROUND

From the general prior art aircraft with an emergency power generation device, or more generally a secondary power generation device, are of known art; the device has a mounting support and a propeller fitted to the end of the support to generate electrical energy. Such units are also designated as ram air turbines. The mounting support is installed in the fuselage or wing of the aircraft such that it can be folded out; in normal operation of the aircraft it is located in a retracted state. In an emergency situation with a decrease in the available energy the mounting support together with the propeller can be extended to generate energy.

From the general prior art aircraft with an auxiliary power generation unit (APU) are of known art; the latter is a combination of a turbine and a generator to generate power, e.g. to supply power to aircraft systems when the aircraft is standing on the ground, and optionally to generate compressed air in order to start the aircraft engines. For this purpose a turbine of the auxiliary power generation unit is mounted in a flow duct between an air inlet duct and an exhaust duct at the tip of the rear section of the aircraft.

From DE 10 2006 003 138 A1 a power supply system for integration into an aircraft system is of known art; this has a secondary power supply device in the form of an emergency supply unit. A duct runs between two openings on the fuselage of the aircraft, with a forward opening and a rearward opening, as seen in the aircraft longitudinal direction. In the duct is arranged a turbine, to which a generator is coupled. On the forward opening a covering device is provided that can be moved between a closed and an open position by means of an electromechanically actuable opening and closing device; the latter is for purposes of covering the opening in the closed position of the covering device. To this end the actuation device is functionally connected with the opening and closing device for purposes of generating an opening or closing signal.

The document U.S. Pat. No. 6,272,838 B1, the document EP 1 767 455 A2, the document U.S. Pat. No. 6,247,668 B1 and the document U.S. Pat. No. 7,222,819 B1 each describe means of control for the inlet flap of an APU.

GB 2419640 describes an APU that is provided for the purpose of temporarily generating energy in flight, e.g. in the event of an "engine out condition". To this end the APU is arranged in a duct into which ram air can gain access to drive the APU, via an inlet that can be closed and opened by a flap.

SUMMARY

Embodiments of the invention provide a power supply system for integration into an aircraft system, with which, whilst utilising resources in an optimal manner, a sufficient level of reliability is guaranteed for the provision of power to operate loads.

In accordance with the invention a power supply system is in particular provided for integration into an aircraft system, which has:

- a secondary power supply device, having: a duct running between two openings on the fuselage of the aircraft, with a forward opening and a rearward opening, as seen in the longitudinal direction of the aircraft, a turbine arranged in the duct with a generator coupled to the former, a covering device that can be moved between a closed and an open position for purposes of covering the forward opening in its closed position, an opening and closing device and an unlocking device, which is assigned to the covering device, and which is embodied such that it locks the covering device if a current with a first signal strength or current strength is supplied to the unlocking device, and unlocks the covering device if a current with a second signal strength or current strength is supplied to the unlocking device, wherein the second signal strength is less than the first signal strength by at least a predetermined value,
- at least one actuation device that is functionally connected with the opening and closing device for purposes of generating an opening or closing signal for the same,
- an opening function switching device that is functionally coupled with a power generation monitoring device, which opening function switching device is functionally connected via a control cable with the unlocking device, and which is embodied such that in an initial state it activates the unlocking device electrically with a first signal strength, with which the latter locks the covering device, and that on receipt of a power requirement signal from the power generation monitoring device it activates the unlocking device electrically with the second signal strength, with which the latter unlocks the covering device.

In accordance with one form of embodiment of the power supply system according to the invention the unlocking device is embodied such that it can be actuated electromagnetically.

The covering device can be embodied as a cover, which is articulated on the fuselage by means of an articulation such that the articulation is positioned on the rearward side of the opening, as seen in the longitudinal direction of the aircraft. The cover can be embodied such that the wind forces in flight push the cover against the retention forces of the first or second opening and closing device respectively into the open state.

The at least one actuation device can in particular be embodied such that it can be actuated manually, wherein for purposes of generating an opening or closing signal, with manual actuation of the same, this is connected in each case via a connecting cable with the electromechanically actuable opening and closing devices.

The unlocking device can have a preload device, which preloads the covering device into its open position, if the latter is located in its unlocked state. The unlocking device can have a pyrotechnic device, which is functionally connected via the control cable with the opening function switching unit, and is embodied such that it is triggered if the latter activates the unlocking device electrically with the second signal strength. The pyrotechnic device can have a gas generator or an explosive device. In the embodiment of the unlocking device with a pyrotechnic device the unlocking device remains released when the pyrotechnic device is triggered. If this situation occurs during flight operations the covering device is no longer closed in flight. Here the second signal strength can be coupled to an emergency situation, in which the opening of the covering device is designed to take place with a high level of reliability. Closing of the covering device then takes place on the ground by hand, together with a charging of the pyrotechnic device.

In accordance with one form of embodiment of the invention the rearward opening of the duct is constituted in terms of an outlet opening on the rear section of the aircraft fuselage.

In accordance with a further form of embodiment of the invention an auxiliary turbine can be installed in the rear section of the aircraft; this is positioned between an inlet duct with an inlet opening on the fuselage and an outlet duct, wherein the outlet duct within the rear section of the fuselage is joined with the second duct section by means of a coupling section, so that the second opening of the second duct section is the outlet opening of the outlet duct.

In accordance with one form of embodiment of the invention is in particular provided, that on the rearward opening a second covering device, movable between a closed and an open position, is arranged for purposes of covering the same in the closed position, that a second opening and closing device and a second unlocking device are assigned to the covering device, the unlocking device being assigned to the covering device and embodied such that it locks the covering device if a current with a first signal strength is supplied to the unlocking device, and unlocks the covering device if a current with a second signal strength is supplied to the unlocking device, wherein the second signal strength is less than the first signal strength by at least a predetermined value, that the power supply system has at least one actuation device for purposes of generating an opening or closing signal for the second opening and closing device, which is assigned to the second covering device.

that the opening function switching device is functionally coupled via a control cable with the second unlocking device, and is embodied such that in an initial state it activates the second unlocking device electrically with a first signal strength, with which the latter locks the covering device, and that on receipt of a power requirement signal from the power generation monitoring device it activates the second unlocking device electrically with the second signal strength, with which the latter unlocks the covering device.

In this form of embodiment of the power supply system in accordance with the invention the unlocking device can be embodied such that it can be actuated electromagnetically.

Here provision can be made that the second covering device has a cover, which by means of a rotational articulation is arranged such that the cover covers the second opening if the cover is located in its closed position, and that the rotational articulation is positioned on one side, which as seen in the presumed flow direction of the of the air flowing around the fuselage forms the rearward side of the opening, so that in the open position of the second cover the inner face of the same is facing away from the flow. The cover can be embodied such that the wind forces in flight push the cover against the retention forces of the first and/or second opening and closing device into the open state.

In accordance with one form of embodiment of the power supply system according to the invention the covering device is embodied as a cover, which is articulated on the fuselage by means of an articulation such that the articulation is positioned on the rearward side of the opening as seen in the longitudinal direction of the aircraft, and the cover is embodied such that the wind forces in flight push the cover against the retention forces of the second opening and closing device into the open state.

In general the at least one actuation device can be embodied such that it can be actuated manually, wherein for purposes of generating an opening or closing signal, with manual actuation of the same, this is connected via a connecting cable with the opening and closing device.

BRIEF DESCRIPTION OF THE DRAWINGS

In what follows examples of embodiment of the invention are described with the aid of the accompanying figures, where.

DESCRIPTION

Figure 1:
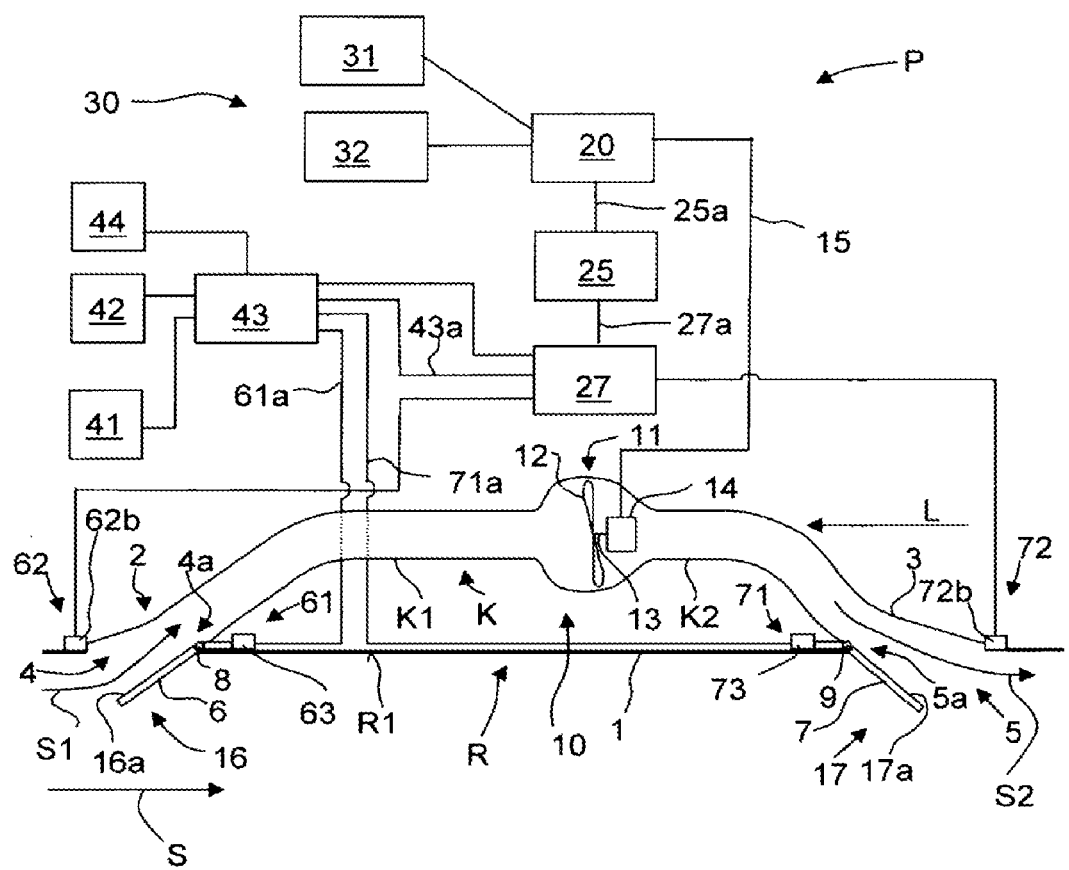
FIG. 1 shows a schematic representation of a section through a side of an aircraft fuselage with a schematic functional representation of one form of embodiment of the invention with electromechanically actuable opening and closing devices, and electromagnetically actuable unlocking devices.

FIG. 1 shows schematically a sectional cut along a section of the fuselage shell 1 of the fuselage R of an aircraft F, together with functions of one form of embodiment of the power supply system P in accordance with the invention. A flow duct K is integrated into the fuselage R; the duct is formed from a first section K1 with an intake opening section 2 and a second section K2 with an outlet opening section 3. The outlet opening section 3 is positioned to the rear of the intake opening section 2 as seen in the aircraft longitudinal direction L. At the point at which the intake opening section 2 opens into the fuselage R, an intake opening or a first opening 4 is configured in the fuselage R. In an analogous manner at the point at which the outlet opening section 3 opens out into the fuselage R, an outlet opening or a second opening 5 is configured in the fuselage R.

On the first opening 4 is arranged a first covering device 6, which in particular can have a first cover 16, which by means of a rotational articulation 8 is shaped and arranged such that the first cover 16 covers the first opening 4, if the first cover 16 is located in its closed position, and that the first cover 16 opens towards that side 4a of the first opening 4, i.e. that the rotational articulation 8 is positioned on a side, which, as seen in the presumed flow direction S of the air flowing around the fuselage R, forms the rearward side of the first opening 4. The first cover 16 thus opens in a manner such that in the open position of the first cover 16 the inner face 16a of the same is facing towards the flow S. In this state the inner face 16a serves as a wall to introduce the flow S1 occurring along the fuselage outer surface R1 and at the opening 4 into the first duct section K1. As an alternative to this the first covering device can also be constituted in terms of a slider.

In an analogous manner in the form of embodiment represented a second covering device 7 is arranged on the second opening 5, which in particular can have a second cover 17. In accordance with one form of embodiment of the invention the second cover 17 is configured and arranged in an analogous manner by means of a rotational articulation 9 such that the second cover 17 covers the second opening 5, if the second cover 17 is located in its closed position, and such that the second cover 17 opens towards that side 5a of the second opening 5, i.e. that the rotational articulation 9 is positioned on a side, which, as seen in the presumed flow direction S of the air flowing around the fuselage R, forms the forward side of the second opening 5. The second cover 17 thus opens in a manner such that in the open position of the second cover 17 the inner face 17a of the same is facing towards the air S2 flowing out of the second opening 5 and the outer face 17b of the same is facing towards the flow S flowing around the fuselage. Thus in its open position the cover 17 aids the discharge of air from the second duct section K2. As an alternative to this the second covering device can also be constituted in terms of a slider.

In accordance with a further form of embodiment of the invention the second covering device 7 can be embodied such that this can have a second cover 17, which by means of a rotational articulation 9 is configured and arranged such that the cover 17 covers the second opening 5, if the cover 17 is located in its closed position, and such that the cover 17 opens towards that side of the second opening 5, i.e. that the rotational articulation 9 is positioned on a side, which, as seen in the presumed flow direction S of the air flowing around the fuselage R, forms the rearward side of the opening 5. The second cover 17 thus opens in a manner such that in the open position of the second cover 17 the inner face 5a of the same is facing towards the flow S.

Alternatively provision can be made that no covering device, or no covering device of this type, is arranged on the second opening 5.

Between the first section K1 and the second section K2 is integrated a secondary power generation device 10 as part of the power supply system P. The secondary power generation device 10 has a turbine casing 11, a turbine 12, and a generator 14 coupled to the turbine via an appropriate axis of rotation 13. If in an emergency supply mode of operation the first cover 16 and the second cover 17 are located in their open positions, air flows through the turbine casing 11 and thereby drives the turbine 12 and consequently the generator 14. The power thereby generated in the emergency supply mode of operation is supplied via an electrical cable 15 to the power supply system P and, in accordance with one form of embodiment of the invention to a power distribution device 20 of the power supply system P.

The power distribution device 20 optionally provided as a component of the power supply system P is functionally coupled with primary power generation devices 31, 32 and with the secondary power supply device 10, so as to receive power generated by each of these sources, and from these sources to output a required output power to loads of the aircraft system.

In the primary supply mode of operation at least one primary power generation device, or a plurality of primary power generation devices 31, 32 of a primary power generation system 30, of the aircraft system, generates electrical power. In one form of embodiment of the invention the one primary power generation device or the primary power generation devices 31, 32 each have at least one generator, which is coupled to an output shaft of an aircraft engine.

The power supply system P in accordance with the invention has, in addition to the power distribution device 20, furthermore a power generation monitoring device 25 functionally coupled with the power distribution device via a cable 25a, and an opening, function switching device 27 functionally coupled with the power distribution device via a cable 27a.

Furthermore the power supply system P in accordance with the invention has at least one actuation device 41, 42, which in each case is coupled with an activation device 43. In the form of embodiment of the power supply system P represented in FIG. 1 two actuation devices 41, 42 are provided. The flight control system 44 is furthermore functionally coupled with the activation device 43.

A first opening and closing device 61 and a first unlocking device 62 act together with the first cover 16. Similarly a second opening and closing device 71 and a second unlocking device 72 act together with the second cover 17. The opening and closing devices 61, 71, are each functionally connected via signal cables 61a and 71a respectively with the activation device 43. The opening and closing devices 61, 71 are preferably embodied in each case as electromechanical unlocking devices and in each case have an electromechanical actuator 63, 73.

The opening and closing devices 61, 71 are actuated on the basis of an appropriate command signal generated by the activation device 43 such that the respective cover, 16 or 17 respectively, can be opened or closed. This command signal is generated by the activation device 43 on the basis of actuation commands that are transmitted from an actuation device to the activation device 43, if the data transmitted from the flight control system 44 to the activation device 43 permits this. To this end the activation device 43 can have a monitoring function with condition logic. In accordance with one form of embodiment of the invention the first actuation device 41 can be a manual actuation switch, which is arranged in the cockpit area of the aircraft F. The activation device 43 can be embodied such that on receipt of an actuation signal this then generates a command signal to open or close the first and second opening and closing devices 61, 71 and transmits this to the latter, if predetermined operating conditions, and in particular ground conditions, stored in the activation device 43, are met; this is determined by a comparison with data transmitted from the flight control system 44 to the activation device 43. For this purpose the activation device 43, has a checking function, which upon input of an actuation command from an actuation device 41, 42 checks whether the conditions to be fulfilled for the execution of the respective actuation command are met. For example a condition can be the presence of aircraft contact with the ground, or a safe operating state of the aircraft on the ground. This condition can alternatively or additionally be met by staying below a maximum flying altitude. Optionally provision can alternatively or additionally be made that the condition can be that of staying below a turbine disc speed of the turbine 11, so that the condition can be viewed as fulfilled if the turbine disc speed of the turbine 11 lies under a predetermined limiting value. In this form of embodiment of the invention provision is made that the turbine disc speed of the turbine 11 is transmitted from the flight control system 44 via an appropriate functional connection between the turbine 11 and the flight control system 44 as an input signal from the flight control system 44 to the activation device 43. By this means it can be ensured that an opening or closing of the first and second opening and closing devices 61, 71 can actually only take place for maintenance purposes, or for power generation, if the main engines of the aircraft are not running.

The second actuation device 42 can in particular be a manual switch on a maintenance module of the aircraft, or a manual switch for ground and/or maintenance personnel.

The first and second unlocking devices 62, 72, are in each case activated, i.e. brought into a state in which these unlock the first and second covering devices 6, 7 respectively, or the covers 16, 17, respectively, if the power generation monitoring device 25 establishes that the power distribution device 20 is no longer in a position to maintain or find a minimum required power and to output this to the loads on the aircraft system. In this case the power generation monitoring device 25 transmits an unlocking command or unlocking signal to the opening function switching device 27. The opening function switching device 27 is embodied such that on receipt of such an unlocking command this switches the actuator 62b of the first unlocking device 62 and the actuator 72b of the second unlocking device 72 into an unpowered state, or supplies them with only a relatively low current. The actuators of the first and second unlocking devices 62, 72 are in each case embodied as electromagnetic unlocking devices, which lock the first covering device 6 or the second covering device 7 respectively if the actuators 62b, 72b of the first covering device 6 or the second covering device 7 respectively in each case receive no electrical signal, or only a relatively low current is supplied to them. Vice versa, the first and second unlocking devices 62, 72 unlock the first covering device 6 or the second covering device 7 respectively only if a predetermined electrical signal is supplied in each case to the actuators 62b, 72b of the first covering device 6 or the second covering device 7 respectively, or if a signal is supplied to them that exceeds a predetermined current, with which the actuators 62b, 72b in each case are brought into their locked state. The relatively low current for purposes of locking the actuators 62b, 72b can in particular be provided such that this must be lower by at least a predetermined value than the current with which the actuators 62b, 72b are unlocked. The predetermined value can in particular be 30% of the locking current, or more.

Alternatively to this, provision can also be made that the unlocking command is transmitted from the power generation monitoring device 25 directly to the first and second unlocking devices 62, 72, which in turn, on the basis of the above cited conditions, transmit the command signals to the actuators 62b and 72b respectively.

By means of this configuration of the power supply system P the covering devices 6, 7 can only then be opened via the actuation devices 41, 42 if this is permitted by the flight control system 44. Depending upon the form of embodiment of the invention, this is in particular the case in ground-based operations, or until shortly after aircraft takeoff, or towards the end of the flight. On the other hand, however, the first covering device 6 and, in a further form of embodiment of the invention, the second covering device 7 also, can be configured such that these open if a command signal of a predetermined current strength is supplied to the actuators 62b, 72b.

For this purpose the actuators 62b, 72b can have a preload device, with which the first covering device 16 and/or the second covering device 17 are preloaded into their open positions. To this end alternatively or additionally, an appropriately dimensioned pyrotechnic device, which can e.g. be constituted in terms of a gas generator or an explosive device, can also be installed on the respective covering device 6, 7 or the actuators 62b, 72b; these are in each case activated by an unlocking signal and on the basis of the latter the first and/or second unlocking device 62 or 72 respectively is brought into an unlocked state.

Alternatively or additionally the first covering device or the first cover 16, or also the second covering device or the second cover 17, can be embodied such that the wind forces in flight push at least the first covering device or the first cover 16 against the retention forces of the first or second opening and closing device 71 respectively into the open state.

In accordance with an alternative form of embodiment of the invention provision can be made that the opening function switching device 27 is functionally connected with the activation device 43 via a connecting cable 43a. Furthermore the opening function switching device 27 is thereby embodied with a logical function or a comparison function such that this only then transmits an unlocking command to the first and second unlocking devices 62, 72 if the activation device 43 generates and transmits, or has transmitted, a command signal for purposes of opening or closing the first and second opening and closing devices 61, 71, so that the conditions described for the transmission of the command signal are also met. In this manner the opening of the respective covering device 6, 7 is aided by the opening or closing of the first and second opening and closing devices 61, 71.

In the form of embodiment of the second covering device 7, in which the second cover 17 is opened in such a manner that in the open position of the second cover 17 the inner face 5a of the same is facing towards the flow S, with the unlocking of the second covering device 7 in flight the latter is moved by the wind forces into its open position.

In a further form of embodiment of the invention that is in accordance with the invention, alternatively or additionally to an above-cited form of embodiment of the invention, the minimal cross-sectional area of the second duct section K2 is less than the minimal cross-sectional area of the first duct section K1. In a form of embodiment of the invention with a second covering device 7 for the second duct section K2 the second covering device 7, as a result of the internal pressure in the duct K arising by virtue of the opening of the first covering device 6 in flight, is in this manner pushed open.

For purposes of establishing the necessity for additional energy demand the power generation monitoring device 25 receives power parameters, and in particular the time-dependent power outputs of the primary power generation devices 31, 32, from the power distribution device 20. The power generation monitoring device 25 has a monitoring function, which from the power parameters received and the power outputs of the primary power generation devices 31, 32, determines the power supply required from the secondary power generation device 10. This takes place in particular from a comparison of a required power output with an actual power output provided by the primary power generation devices 31, 32.

For purposes of monitoring the availability of power for the power distribution device 20 the power generation monitoring device 25 can alternatively or additionally have a function with which the Lenz effect, in other words a specific surge, is detected on the generators, so as to establish a loss of performance or failure of a generator. Alternatively or additionally a predetermined power characteristic that is representative of the respective generator in a state of transition from full functionality to generator failure, can thereby be stored and a function detection function can be integrated in the power generation monitoring device 25, which compares the functional characteristic in the event of failure with the power characteristic actually occurring, and generates an unlocking signal and transmits this to the opening function switching device 27 if an agreement or similarity between these signals is established in this manner.

Figure 2:
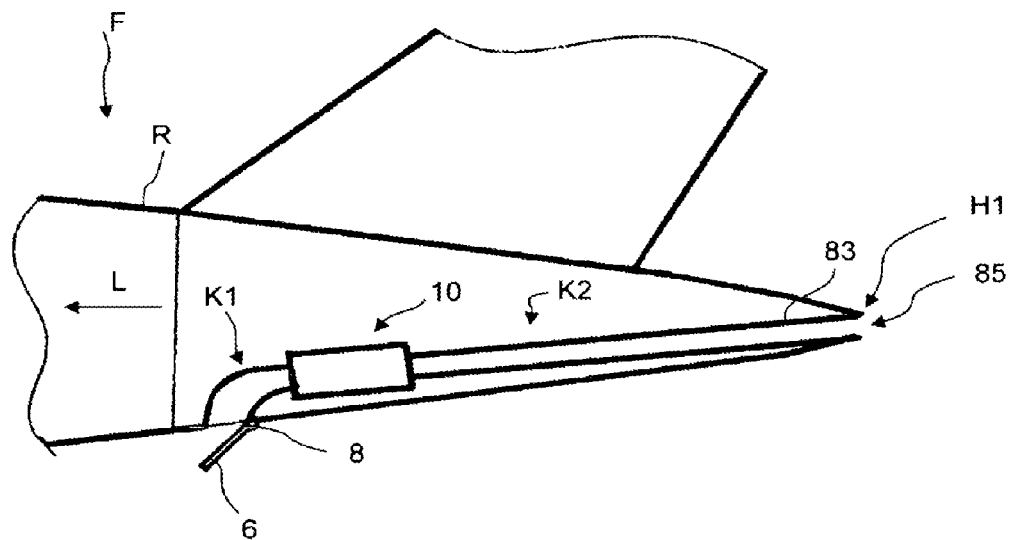
FIG. 2 shows a schematic representation of a section through a rear fuselage section with a first form of embodiment for the integration of an auxiliary energy generation device into the rear fuselage section, in which the opening and closing devices and unlocking devices are not represented.

In a further form of embodiment of the invention the second duct section K2 is not covered by a second covering device 7. FIG. 2 shows one form of embodiment of the invention, in which the second duct section K2 with a duct section 83 discharges at the tip H1 of the rear section H of the aircraft with an outlet opening 85. In general the second duct section K2 with the outlet opening 85 can discharge on a section of the surface of the rear section H, which, as seen in the longitudinal direction L of the fuselage R running from the rear section H to the aircraft nose, is positioned behind the secondary power generation device 10.

Figure 3:
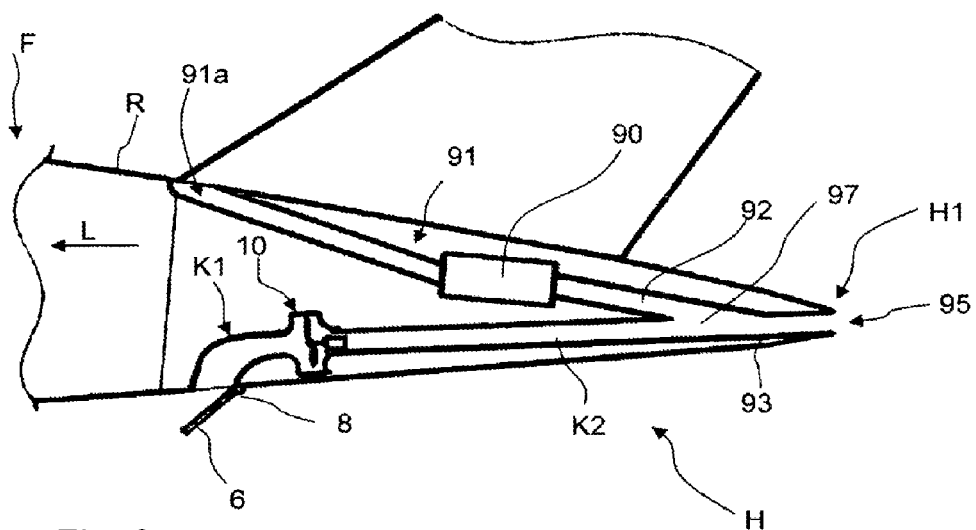
FIG. 3 shows a schematic representation of a section through a rear fuselage section with a second form of embodiment for the integration of an auxiliary energy generation device into the rear fuselage section, in which the opening and closing devices and unlocking devices are not represented.

In a further form of embodiment of the invention the rear section H, or more particularly, the power supply system P, can have an auxiliary turbine, or auxiliary power unit (APU) 90, installed in the rear section H, which is positioned between an inlet duct 91 with an inlet opening 91a, and an outlet duct 92. The power supply system P in accordance with the invention can otherwise be configured in accordance with one of the forms of embodiment in accordance with the invention. Here the outlet duct 92 can be joined within the rear section H of the fuselage R with the second duct section K2 by means of a coupling section 97. The auxiliary turbine or auxiliary power unit APU (FIGS. 2 and 3) is installed in the rear section of the aircraft and is provided in particular for ground-based operations of the aircraft. The auxiliary turbine or an auxiliary power unit APU is thereby in particular provided and equipped for purposes of starting the aircraft engines and has a power generation device, and also a functional connection to the aircraft engines for purposes of transferring the power generated to the latter. The outlet opening 95 from the fuselage R of the outlet duct 93 can in particular be arranged in the rear section tip H1, or on the side of the same; however, as seen in the longitudinal direction L it is arranged behind the auxiliary turbine or auxiliary power unit (APU) 90.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

REFERENCE SYMBOL LIST

F Aircraft
H Rear section of the aircraft F
H1 Rear section tip H1 of the rear section H
K Flow duct
K1 First section
K2 Second section
L Longitudinal direction of the aircraft
P Power supply system
R Fuselage
R1 Fuselage external surface
S Flow direction
S1 Flow
S2 Exiting airflow
1 Fuselage shell
2 Intake opening section
3 Outlet opening section
4 Intake opening or a first opening
4a Face of the first opening 4
5 Outlet opening or a second opening
5a Face 5a of the second opening 5
6 First covering device
7 Second covering device
8 Rotational articulation
9 Rotational articulation
10 Secondary power generation device
15 Electrical cable
16 First cover
16a Inner face
17 Second cover
17a Inner face
17b Outer face
20 Power distribution device
25 Power generation monitoring device
27 Opening function switching device
30 Primary power generation system
31, 32 Primary power generation devices
41, 42 Actuation devices
43 Activation device
44 Flight control system
61 First opening and closing device
62 First unlocking device
62b Actuator
71 Second opening and closing device
72 Second unlocking device
72b Actuator
83 Duct section to the rear section tip H1
85 Outlet opening
93 Duct section to the rear section tip H1
90 Auxiliary turbine or auxiliary power unit (APU) installed in the rear section H
91 Inlet duct
91a Inlet opening
92 Outlet duct
93 Outlet duct
95 Outlet opening
97 Coupling section

The invention claimed is:

1. A power generation system for integration into an aircraft fuselage, the power generation system comprising:
a secondary power supply device, comprising:
a duct running between two openings on the fuselage, wherein one is a forward opening and the other a rearward opening along an aircraft longitudinal direction,
a turbine arranged in the duct with a generator coupled to the turbine,
a covering device, movable between a closed and an open position for covering the forward opening in its closed position,
an opening and closing device, and
an unlocking device, which is assigned to the covering device and which is configured such that the unlocking device locks the covering device if a current with a first signal strength is supplied to the unlocking device, and unlocks the covering device, if a current with a second signal strength is supplied to the unlocking device wherein the second signal strength is less than the first signal strength;
at least one actuation device that is functionally connected with the opening and closing device for generating an opening or closing signal for the same; and
an opening function switching device that is functionally coupled with a power generation monitoring device, wherein the opening function switching device is also functionally connected via a control cable with the unlocking device;

wherein the opening function switching device is configured such that in an initial state the opening function switching device activates the unlocking device electrically with the first signal strength, with which the unlocking device locks the covering device; and wherein on receipt of a power requirement signal from the power generation monitoring device the opening function switching device activates the unlocking device electrically with the second signal strength, with which the unlocking device unlocks the covering device.

2. The power generation system in accordance with claim 1, wherein the unlocking device can be actuated electromagnetically.

3. The power generation system in accordance with claim 1, wherein the covering device is configured as a cover, which is articulated on the fuselage by an articulation, such that the articulation is positioned on the rearward side of the forward opening along the longitudinal direction of the aircraft; and wherein the cover is configured such that wind forces in flight push the cover into the open position.

4. The power generation system in accordance with claim 1, wherein the at least one actuation device is configured such that the at least one actuation device can be actuated manually.

5. The power generation system in accordance with claim 1, wherein the rearward opening of the duct is constituted in terms of an outlet opening on a rear section of the aircraft fuselage.

6. The power generation system in accordance with claim 1, further comprising:

a second duct in the aircraft fuselage having a forward and a rearward opening, wherein the forward opening is an inlet and the rearward opening is an outlet;

wherein a coupling section connects the outlet of the second duct to the rearward opening of the first duct; and wherein an auxiliary turbine is installed within the second duct.

7. The power generation system in accordance to claim 1, wherein a second covering device, movable between a closed and an open position, is arranged on the rearward opening for covering the rearward opening in the closed position;

wherein a second opening and closing device and a second unlocking device are assigned to the second covering device, the second unlocking device being assigned to the second covering device and configured such that the second unlocking device locks the second covering device if a current with a first signal strength is supplied to the second unlocking device, and unlocks the second covering device if a current with a second signal strength is supplied to the second unlocking device, wherein the second signal strength is less than the first signal strength;

wherein the power generation system has at least one actuation device for purposes of generating an opening or closing signal for the second opening and closing device, which is assigned to the second covering device; and wherein the opening function switching device is functionally coupled via a control cable with the second unlocking device, and is configured such that in an initial state the opening function switching device electrically activates the second unlocking device with a first signal strength, with which the second unlocking device locks the second covering device, and that on receipt of a power requirement signal from the power generation monitoring device the opening function switching device electrically activates the second unlocking device with the second signal strength, with which the second unlocking device unlocks the covering device.

8. The power generation system in accordance with claim 7, wherein the second unlocking device can be actuated electromagnetically.

9. The power generation system in accordance with claim 8, wherein the second covering device is configured as a cover, which is articulated on the fuselage by an articulation positioned on the rearward side of the rearward opening along the longitudinal direction of the aircraft; and wherein the cover is configured such that the wind forces in flight push the cover into the open position.

10. The power generation system in accordance with claim 7, wherein the second covering device has a cover, which by a rotational articulation is arranged such that the cover covers the rearward opening if the cover is located in its closed position; and wherein the rotational articulation is positioned on a side forming the forward side of the rearward opening in the aircraft longitudinal direction.

11. The power generation system in accordance with claim 7, wherein the at least one actuation device is configured such that the at least one actuation device can be actuated manually.

* * * * *